Dec. 13, 1960   LE ROY E. DEMAREST ET AL   2,964,181
GRADING AND SEPARATING DEVICE
Filed May 17, 1956   5 Sheets-Sheet 1
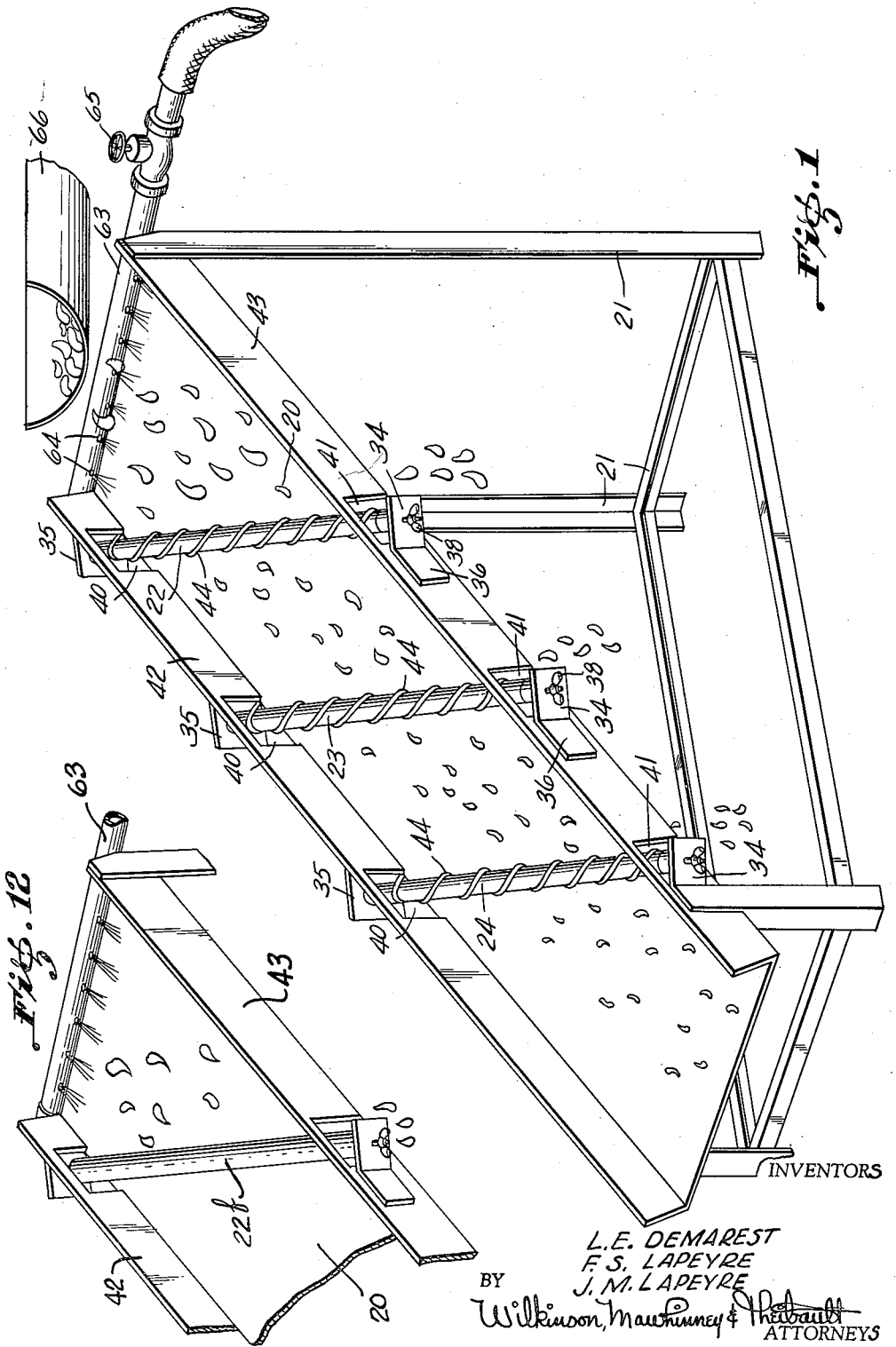
INVENTORS
L.E. DEMAREST
F.S. LAPEYRE
J.M. LAPEYRE
BY Wilkinson, Mawhinney & Theibault
ATTORNEYS Dec. 13, 1960  LE ROY E. DEMAREST ET AL  2,964,181
GRADING AND SEPARATING DEVICE
Filed May 17, 1956  5 Sheets-Sheet 3
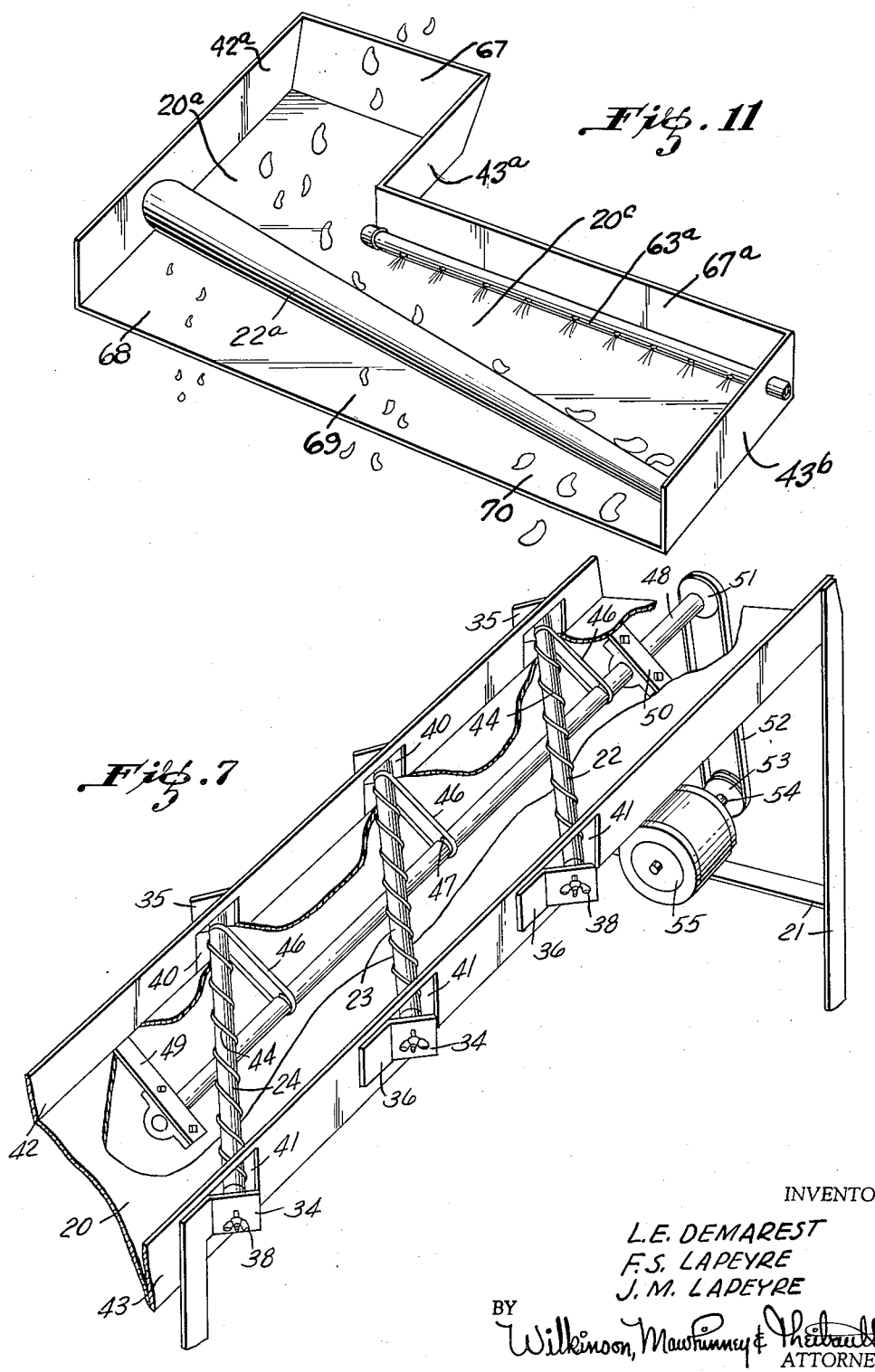
INVENTORS
L.E. DEMAREST
F.S. LAPEYRE
J.M. LAPEYRE
BY Wilkinson, Mawhinney & Theibault
ATTORNEYS

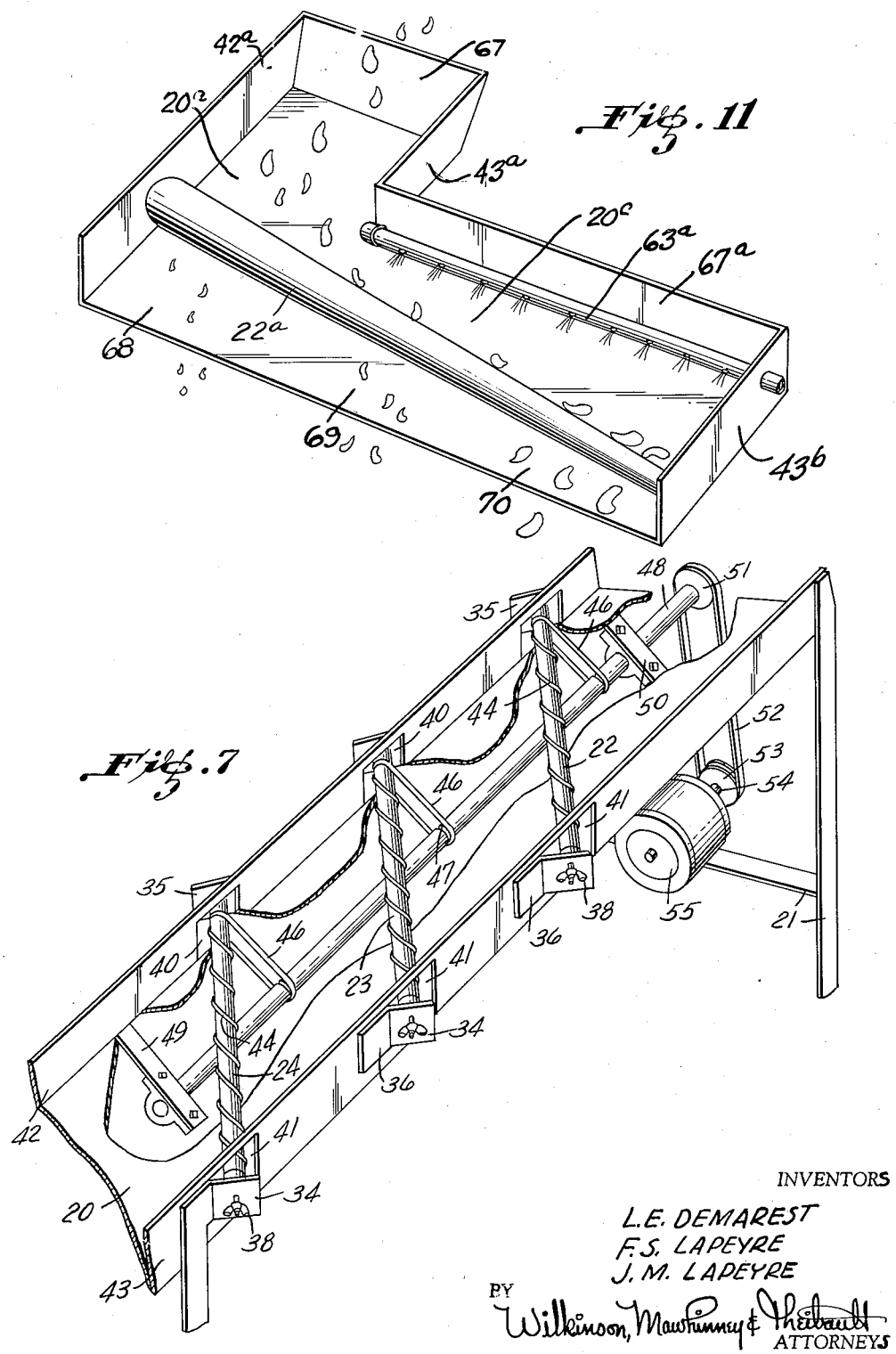

Dec. 13, 1960    LE ROY E. DEMAREST ET AL    2,964,181
                 GRADING AND SEPARATING DEVICE
Filed May 17, 1956                           5 Sheets-Sheet 4

INVENTORS
L.E. DEMAREST
F.S. LAPEYRE
J.M. LAPEYRE
BY
Wilkinson, Mawhinney & Theibault
                              ATTORNEYS

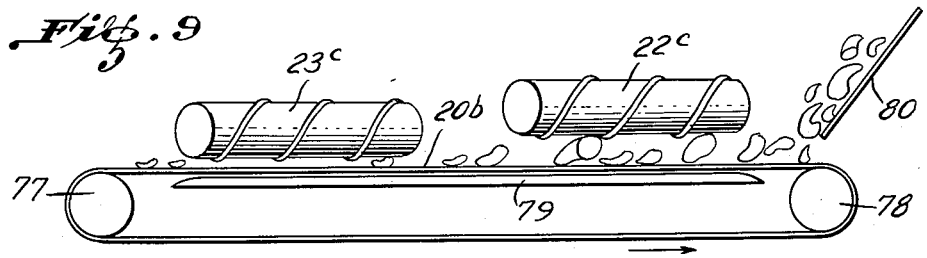
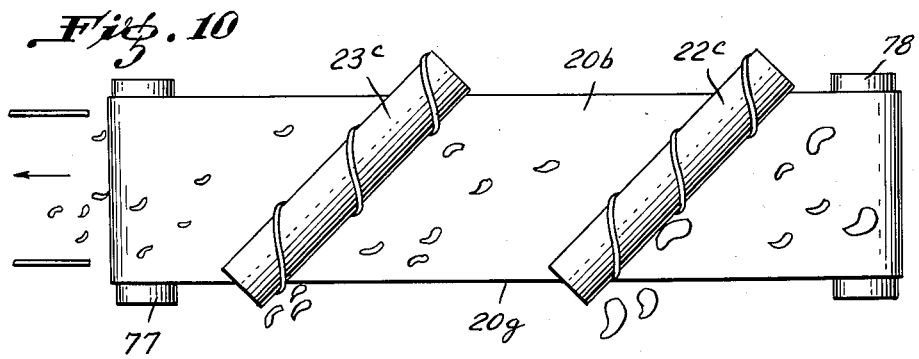
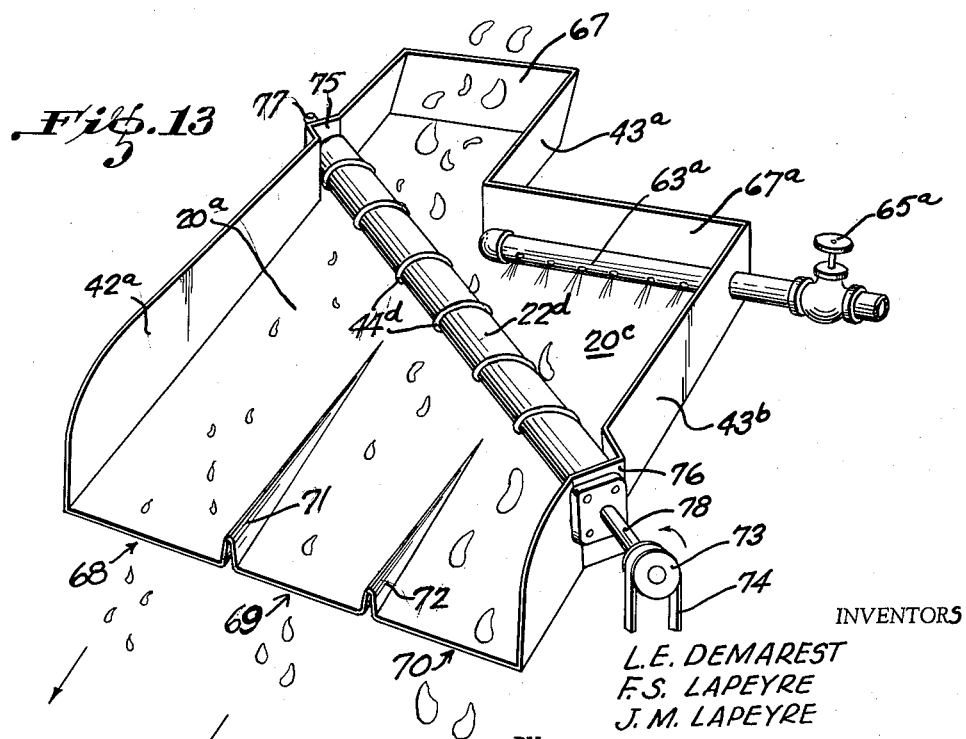

United States Patent Office 2,964,181
Patented Dec. 13, 1960

2,964,181

GRADING AND SEPARATING DEVICE

Le Roy E. Demarest, Fernand S. Lapeyre, and James M. Lapeyre, New Orleans, La., assignors to The Peelers Company, Houma, La., a partnership Filed May 17, 1956, Ser. No. 585,428

10 Claims. (Cl. 209—91)

The present invention relates to grading and separating device and will be found particularly useful in the grading and separating of peeled shrimp, concerning which there are no satisfactory machines at present available.

The market value of peeled shrimp may be easily impaired due to the delicate nature of the product and the greatest care must be exercised in the processing of shrimp after the peeling of the same. It is accordingly an object of the invention to provide a grading and separating machine which will sort the peeled meat as to size and deliver it to separate designations according to grade without subjecting the meat to crushing, or any other damage that would detract from its commercial value in the market.

Another object of the invention is to provide a grading and separating device which will have a high capacity for sorting shrimp rapidly and economically and at the same time performing an efficient job of sorting the shrimp as to size.

A further object of the invention is to provide a grading and separating device embodying a simple principle adapted to be embodied in a variety of forms, all of simple construction, having few moving parts, if any, and adapted not only to sort the shrimp as to size but also to separate therefrom the hulls or any other trash that may be adherent thereto as an aftermath of preceding operations to which the shrimp have been subjected, for instance the operation of shelling.

Now, while the device according to the present invention is particularly calculated to sort shrimp effectively and not destructively, it will be understood that the device may also be employed for the grading and separating of beheaded shrimp still in the shell or for that matter of the natural shrimp as they come from the water; the device being also applicable for the grading of shelled oysters and possibly other materials of mixed sizes.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is an isometric view of a form of grading and separating device constructed in accordance with the invention.

Figure 2 is a longitudinal sectional view taken vertically through the same.

Figure 3 is an exploded perspective view showing a fragment of a grading roller, its adjustable bearing and bracket at an exit end of the roller.

Figure 4 is a fragmentary exploded perspective view of a grading roller, its adjustable bearing and bracket at the opposite end together with a form of drive connection to the roller.

Figure 5 is a partial side elevational view of a form of grading roller with a spiral thread having a rounded cross section.

Figure 6 is a similar view showing a modified spiral thread having a rectangular cross section.

Figure 7 is an isometric view of the device with parts broken away and parts shown in section and illustrating a form of drive mechanism for the spiral grading rollers.

Figure 9 is a side elevational view of a further modified form of the invention in which the pan is an endless movable conveyor disposed horizontally.

Figure 10 is a top plan view of the same.

Figure 11 is an isometric view of a still further modified form of the invention showing a grading member as a spiralless bar of frusto-conical shape.

Figure 12 is also a fragmentary isometric view of a still further modified form in which a grading member is smooth, non-rotating and inclined to the path of the material to automatically deflect the rejected material therealong to the outlet.

Figure 13 is an isometric view of a further modified form of the invention in which the grading bar is diagonal, of uniform diameter and inclined vertically from end to end to produce a progressively widening gap with the pan bottom to grade the shrimp.

Figure 8:
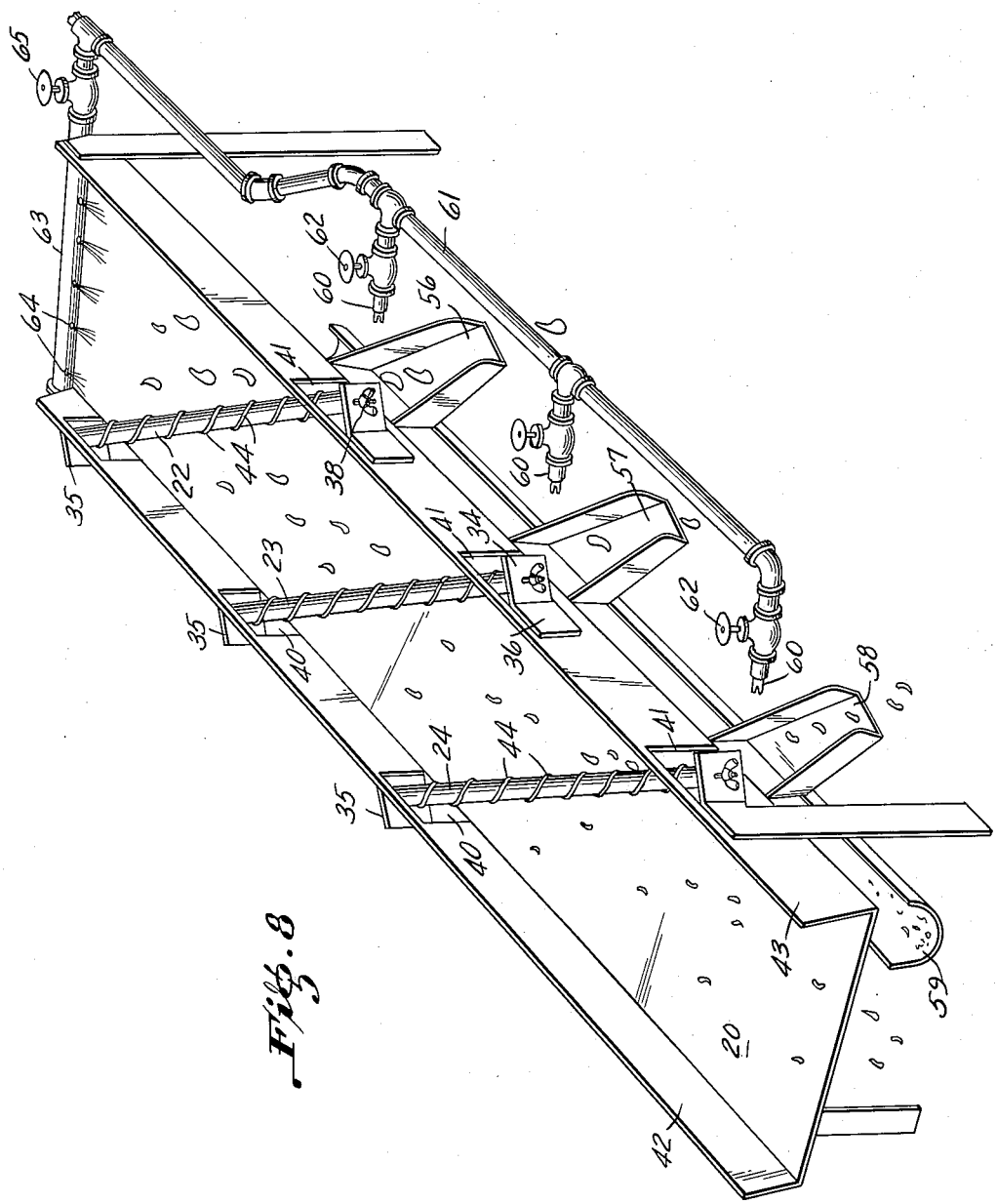
Figure 8 is also an isometric view of the device illustrating more particularly the water spray manifold system, discharge chutes and trash flume.

Referring more particularly to the drawings, and for the present to Figures 1 to 8 inclusive, 20 designates a pan which constitutes one grading member and may be supported by a frame 21 so that the pan assumes an inclined plane.

The second or complementary grading member may be constituted by a bar or roller section 22. Other bar or roller sections 23, 24 in any appropriate number may be provided. These various bars or roller sections 22, 23 and 24 are spaced differentially above the surface of the inclined pan 20 which is made from some smooth material for instance metal to induce the movement of the shrimp or other material to be graded in a sliding motion down the inclined pan 20.

As will be seen in Figure 2 the uppermost bar or roller section 22 is spaced above the pan 20 to provide a grading gap of largest size permitting the passage therethrough of all of the material or shrimp except the largest size or largest particle size. The other bar or roller sections 23, 24 etc. are spaced at progressively lesser distances from the pan 20 to provide a series of grading gaps which are stepped down from the largest to the smallest with reference to the high and low ends of the inclined pan 20.

In this form of the invention all of the bars or roller sections 22, 23, 24 etc. may be of uniform diameter and the stepped grading gaps provided thereby are regulated by the adjustment of the supports for these bars or roller sections.

For instance as illustrated in Figures 3 and 4, the ends of the bars or roller sections 22 etc. are provided with turned down trunnions 25, 26 adapted to fit in the bores 29 of bearings 27 and 28. The bearings are supported by threaded studs 30, 31 which are adjustably received in vertical slots 32, 33 in diagonal brackets 34, 35 which are affixed by bracket plates 36, 37 to side walls 42 and 43 of the pan 20.

Wing or other nuts 38, 39 are threaded upon the studs 30, 31 on the outsides of the brackets 34, 35 to afford a convenient means for manually affixing the bearings 27 and 28 at a suitable elevation in the brackets 34, 35; by which the bar or roller sections 22, 23, 24 etc. may be adjusted as to height with reference to the pan 20.

While the slots 32, 33 are described as vertical slots, it will be understood that these slots may be elongated in an angle to the vertical which substantially equates the angle of inclination of the pan 20. In other words the slots 32, 33 as to length, may be normal to the plane of the pan bottom 20.

The diagonal brackets 34, 35 are disposed on the outside of openings 40, 41 in the side walls 42, 43 so as to permit the ends of the rollers or the bearings to project through these openings to the exterior of the side walls 42, 43 where they find support in the diagonal brackets 34, which are externally of the trough provided by the pan 20 and its side walls 42, 43.

While the bar or roller sections 22, 23, 24 etc. may be located at substantially right angles transversely of the pan 20, it is preferred that these bars or roller sections assume a diagonal position with respect to the pan 20 as illustrated in Figures 1, 7 and 8, in which event the openings 41 through the side wall 43 at the lower ends of the bar or roller sections constitute exit or discharge openings for the shrimp or other material of a particle size too great to pass through the particular gap.

Where the bar or roller sections 22, 23, 24 etc. are rotatable, as illustrated in Figures 1 to 8 inclusive, the same are preferably traversed by a spiral thread 44 of a generally rounded form as shown in Figure 5, or a spiral thread 44a of a generally rectangular section as illustrated in Figure 6.

As shown more particularly in Figures 4 and 7 a form of drive means for the bar or roller sections 22, 23, 24 etc. is illustrated in which grooves 45 at the high ends of such bar or roller sections extending beyond the side pan wall 42 receive flexible drive belts 46, the belts also being accommodated in grooves 47 of a drive shaft 48 which is common to all of the bar or roller sections. The belts may be open as shown in Figure 4 or 7 or they may be crossed to reverse the direction of rotation of the bar or roller sections.

Referring more particularly to Figure 7, the drive shaft 48 extends longitudinally of the pan 20 and is carried in bearing hangers 49 and 50 finding appropriate support in the frame 21. At the upper end of the drive shaft 48 is a fast pulley 51 engaged by the upper end of a transmission flexible belt 52 which is engaged at its lower portion with a fast pulley 53 on the armature shaft 54 of an electric motor 55, also appropriately supported in the frame 21.

It will be understood that other forms of drive means may be employed.

Referring more particularly to Figure 8, discharge chutes 56, 57, 58 etc. are shown as disposed outwardly of the wall 43 and below the exit or discharge openings 41 in position to receive the graded shrimp or other material rejected by the bar or roller sections. A trash flume runs longitudinally down the pan adjoining the high receiving ends of the discharge chutes 56, 57, 58 etc. and liquid or water nozzles are also provided outwardly of the pan wall 43 directed above the discharge chutes and toward the trash flume 59. These various nozzles 60 are all connected with a water or other liquid manifold 61 having individual valves 62 for controlling the flow of liquid to the various nozzles 60. This manifold 61 may also if desired be connected to a water or liquid header 63 provided with perforations directed downwardly of the pan 20 at its higher end for providing flushing water for lubricating the pan and facilitating the movement of the shrimp or other material down the same. A valve 65 controls the flow of the water or other liquid to the header 63. At the high end of the pan there may also be a conveyor or supply chute 66 for supplying the shrimp or other material to the high end of the pan.

The operation of this form of the invention is as follows:

Mixed shrimp or other materials of different particle size are fed in at the uppermost portion of the inclined pan 20, being moved, by gravity aided preferably by the supply of water, in sequence against the several bar or roller sections 22, 23, 24, etc.

Large shrimp are retained by insufficient clearance between the first bar or roller section 22 and the inclined pan 20 and such large shrimp are carried off to one side of the pan by the rotating screw action of the bar or roller section 22. Shrimp sufficiently small to pass between the first bar or roller section 22 and the pan 20 proceed to the second bar or roller section 23 where, if they are retained, they will be carried sidewise to the second exit by the screw action of this second bar or roller section 23. Such shrimp or other material which pass the second grading gap will proceed down the pan to the third bar or roller section 24 where the third largest in size will be rejected at this gap and be caused to move to the exit opening 41 of this third roller or bar section. Shrimp sufficiently small to pass under the third bar or roller section will proceed to a next bar or roller section or fall off the lower end of the pan as the smallest grade. Thus a grading of shrimp according to thickness or size will be effected.

The bar or roller sections 22, 23, 24, etc. may be rotated in either direction. The rotation of these roller sections in the direction of flow, that is clockwise as viewed from the lower ends, improves the trash separation results. The rotation of the roller sections against the flow, that is anticlockwise as viewed from the lower ends of the rollers, provides gentle action on shrimp and the like.

The rounded spiral thread 44 has a gentle action on shrimp and the like. The squared or rectangular cross-section of spiral thread 44a provides a better engagement of shrimp and the like.

Referring more particularly to that form of the invention shown in Figures 9 and 10, 20b shows a pan which is formed by an endless movable belt running over rollers 77 and 78 of which 77 may be a powered roller and the roller 78 an idler. A fixed belt support to table 79 is disposed directly beneath the upper run of the endless belt 20b. The grading bar or roller sections are indicated at 22c and 23c as being representative of any number of grading bar or roller sections desired. These grading bars or roller sections are set at different clearances above the belt 20b, as shown particularly in Figure 9, wherein the first roller section 22c to encounter the incoming shrimp or other material is disposed at a higher elevation above the plane of the belt 20b than the next bar or roller section 23c.

In the operation of this form of the device, the meats fall to the belt from the chute 80 onto the upper run of the belt 20b near the idler pulley or roller 78. The upper run of the belt 20b moves from right to left. This upper run of the belt 20b may be disposed in a substantially horizontal plane and as heretofore illustrated and described water may be supplied to the upper surface of the belt if desired although it will be understood in this instance that the shrimp or other material do not move relatively to the upper run of the belt 20b but are carried along by the belt incident to its movement of translation. Incident to that movement shrimp or other material of a particle size larger than the first gap will be deflected by the spiral rib on the first roller section 22c to a side of the belt near the lower end of the roller section 22c, at which point the larger particle size will be discharged from the belt. The smaller particle size which has passed through the gap of the roller 22c will be carried by the belt down to the next roller section in sequence and either pass therethrough or if of greater particle size will be deflected by the spiral action of this roller section 23c to the side of the belt at a different point where the material of this size may be separately collected. The shrimp or other material of the smallest size which pass beneath the gap of the roller section or bar 23c last in sequence will be discharged over the left hand end of the belt and may be there separately collected.

Referring more particularly to Figure 11, 20ᵃ represents an inclined pan having side walls 42ᵃ and 43ᵃ and a high end wall 67.

The pan is provided with a lateral extension 20ᶜ having a side wall 43ᵇ and a high end wall 67ᵃ.

The grading bar or roller 22ᵃ is of frusto-conical formation having its greater diameter or base arranged at the introductory end 20ᵃ of the pan and tapering gradually over the lateral extension 20ᶜ of such pan, whereby this tapering bar or roller 22ᵃ forms a continuously enlarging grading gap with the bottom of the pan in a direction from left to right enabling the passage of only the smallest shrimp at the left hand portion and gradually larger sizes over to the smallest cross-section end of the grading bar or roller 22ᵃ.

It will be understood that the grading bar or member 22ᵃ may be smooth walled, and fixed against rotation, in which event the incoming gravity fed shrimp, aided also preferably by the incoming water will be driven against the tapered smooth wall and therefore be gradually deflected from left to right, that is from the largest or base diameter of the cone over to the smallest section thereof near the truncated apex. In this way all of the incoming material will be subjected to the gradually increasing grading gap between the pan and this frusto-conical member 22ᵃ. Also this frusto-conical member 22ᵃ may be set in a diagonal angular relation with respect to the path of the incoming material, which, in the case of a non-rotating bar would tend to feed the material along the constantly diminishing and inclined surface thereof with greater facility. Discharge sections 68, 69, 70 etc. are designated along the length of the fixed tapering grading bar 22ᵃ as illustrating where may be delivered small, medium and large shrimp respectively.

A perforated water header 63ᵃ may be arranged along the high end wall 67ᵃ so as to direct water sprays downwardly of the inclined pan section 20ᶜ for lubricating the pan surface and supplying flushing water to facilitate the movement of the shrimp.

It will be understood that mixed sizes of meats are introduced with water at the high end 67 of the inclined pan 20ᵃ. The pan is raised at the high end wall 67 to aid water flow and to give gravity fall to the shrimp and the like. The water header 63ᵃ supplies lubrication for the pan and also affords a water flow to assist the gravity fall of meats that pass under the bar 22ᵃ.

Referring more particularly to Figure 12, 22ᶠ shows a uniform-diameter smooth non-rotary grading bar set diagonally across the pan, the arrangement being generally similar to that illustrated in Figure 1 except that in Figure 1 the spiral rotation is depended upon largely to move the rejected material axially along the grading rollers. On the other hand in Figure 12 it is the momentum or force of the shrimp sliding down by gravity or being moved by the force of the incoming water against the smooth surface of the diagonally or inclined bar 22ᶠ which tends to divert all material that does not pass through the grading gap out the discharge opening at the side of the pan trough.

Referring more particularly to Figure 13, this figure resembles Figure 11 in many particulars and like parts have been given the same reference characters so that no further description need be given of these particular parts. The pan 20ᵃ of Figure 13 is somewhat longer than the similarly numbered pan in Figure 11 in order to accommodate the grading roller 22ᵈ which is arranged at a greater angle of inclination than the grading bar 22ᵃ of Figure 11.

In the case of Figure 13, the grading roller 22ᵈ is, or may be, of substantially uniform diameter and traversed axially by an outstanding spiral thread or rib 44ᵈ. The trunnions 77 and 78 of the grading roller 22ᵈ are journaled in bearings in the outwardly off set sections 75 and 76 of the side walls 42ᵃ and 43ᵇ. It is to be particularly noted that the trunnion 77 is journaled at a low point in the wall section 75; whereas the trunnion 78 at the lower end of the grading roller 22ᵈ is mounted at a higher elevation in the opposed wall section 76. This differential elevational mounting of the two ends of the grading roller 22ᵈ causes this roller to form with the bottom of the pan 20ᵃ and its extension 20ᶜ a grading gap which is progressively enlarging from 75 to 76. At the end close to the side wall 42ᵃ the roller 22ᵈ is close to the pan at an upper end portion of the pan. The grading roller 22ᵈ is mounted high at the end wall 43ᵇ so that this roller or grading bar affords greater clearance for release of large meats which have been carried along by the spiral threads 44ᵈ. The meats pass beneath the roller or grading bar 22ᵈ to the discharge section 68, 69, 70, etc. between which there may be dividers 71, 72 for keeping the graded meats separated.

The pan is arranged on an inclination from the high end 67 down to the discharge section 68, 69, 70, etc. Mixed sizes of meats are introduced to the high end 67. The pan is raised at the high end 67 to aid water flow and fall of meats.

Only trash or small shrimp pass under the bar or roller 22ᵈ for discharge at section 68. The larger sizes are carried farther along the roller or bar 22ᵈ.

Medium sized shrimp are discharged at 69 and the larger shrimp are discharged at 70.

The water which may be introduced at the high end at the pan extension 20ᶜ may be regulated by a valve 65ᵃ.

Where the grading member 22ᵈ is a rotary roller, the same may be given rotation by a pulley 73 fast on its trunnion 78, which pulley is driven by a belt 74 from an appropriate source of power.

Although we have disclosed herein the best form of the invention known to us at this time, we reserve the right to all such modifications and changes as may come within the scope of the following claims.

What is claimed is:

1. In a grading and separating device for peeled shrimp and the like, a pan for receiving the shrimp, support means for supporting the pan at an inclination to promote the fall of shrimp from the high to the low end of the pan, water supply means for delivering water to the high end of the pan for lubricating the pan surface to further induce the sliding of the shrimp on the inclined surface and also to flush the shrimp down such surface, and a rotating spiral roller spaced a preselected distance from the surface of the pan to form a separating gap therewith and disposed diagonally of the pan with a discharge outlet at its lower end for shrimp too large to pass the gap.

2. The grading and separating device of claim 1 in which the water supply means extends substantially across the upper end of the inclined pan to furnish water in a substantial volume to reduce shrimp slime, and further comprising control means to regulate the water supply to assure said volume.

3. The grading and separating device of claim 1 in which the spiral has a sharp edge.

4. The grading and separating device of claim 1 in which the spiral is rectangular in cross section to produce sharp edges.

5. The grading and separating device of claim 1 further comprising means for rotating the roller to cause the spiral to move the shrimp toward the outlet.

6. The grading and separating device of claim 1 further comprising means for adjustably journaling said roller from the pan varying distances to determine gap width.

7. In a grading and separating device for peeled and shell-on shrimp and the like, an inclined pan to which shrimp or the like are delivered at or near the high end, a plurality of grading screws all spaced apart along the length of the pan from the high to the low end of the pan and being inclined to the line of movement of the shrimp down the pan, all grading screws being substantially parallel to one another and all inclined in the same direction so that their low ends discharge all graded shrimp at the same side of the machine, means for introducing water along the high end of the machine, means for regulating the volume and pressure of water delivered through said last-named means for increasing or decreasing the rate of feed of the shrimp to be separated down the inclined pan, and means for receiving all graded shrimp at the same side of the machine.

8. A grading and separating device according to claim 7 further comprising a common drive means for all said grading screws.

9. A grading and separating device according to claim 7 in which said pan has a side wall with openings therethrough through which project the lower ends of said grading screws, and means beyond the openings for adjustably journaling the lower ends of the grading screws.

10. The combination of claim 7 further comprising a trash flume extending down one side of the pan in position to receive trash from the lower ends of the grading screws, fluid pressure means directed to blow the trash issuing from the lower ends of the grading screws into said flume, and individual means for each grading screw positioned off the lower end thereof to receive the rejected shrimp.

References Cited in the file of this patent

UNITED STATES PATENTS

| | | |
|---|---|---|
| 755,937 | Richardson | Mar. 29, 1904 |
| 1,811,991 | Bates | June 30, 1931 |
| 1,820,773 | Bouquet | Aug. 25, 1931 |
| 2,062,946 | Sorensen | Dec. 1, 1936 |
| 2,714,214 | Stern | Aug. 2, 1955 |

FOREIGN PATENTS

| | | |
|---|---|---|
| 21,977 of 1913 | Great Britain | July 16, 1914 |
| 91,303 | Sweden | Jan. 25, 1938 |
| 575,454 | Great Britain | Feb. 19, 1946 |
| 804,493 | Germany | Apr. 23, 1951 |
| 805,542 | France | Aug. 22, 1936 |